United States Patent [19]

Mahler

[11] Patent Number: 5,418,044

[45] Date of Patent: May 23, 1995

[54] IRREVERSIBLY STRETCHABLE LAMINATE COMPRISING LAYERS OF WOVEN OR KNITTED FABRICS AND WATER-VAPOR PERMEABLE FILMS

[75] Inventor: Rolf-Dirk Mahler, Wuppertal, Germany

[73] Assignee: Akzo N.V., Arnhem, Netherlands

[21] Appl. No.: 84,436

[22] Filed: Jul. 1, 1993

Related U.S. Application Data

[63] Continuation of Ser. No. 713,020, Jun. 11, 1991, abandoned, which is a continuation of Ser. No. 457,806, Jan. 5, 1990, abandoned.

[30] Foreign Application Priority Data

May 7, 1988 [DE] Germany ............... 38 15 634.2

[51] Int. Cl.⁶ .................. B32B 27/14; B32B 7/00
[52] U.S. Cl. ..................... 428/196; 428/198; 428/220; 428/245; 428/253; 428/262; 428/265; 428/343; 428/353
[58] Field of Search ........... 428/282, 253, 245, 198, 428/267, 196, 220, 262, 265, 343, 353

[56] References Cited

U.S. PATENT DOCUMENTS

| | | |
|---|---|---|
| 3,510,344 | 1/1973 | Sutton . |
| 3,713,938 | 1/1973 | Sutton . |
| 3,814,658 | 6/1974 | Decker .................... 428/267 |
| 4,298,643 | 11/1981 | Miyaagawa et al. ........ 428/253 |
| 4,303,712 | 12/1981 | Woodroof ................. 428/253 |
| 4,443,511 | 4/1984 | Worden et al. ........... 428/253 |
| 4,493,870 | 1/1985 | Vrovenraets et al. ...... 428/245 |
| 4,520,066 | 5/1985 | Jackrel . |
| 4,545,841 | 10/1985 | Jackrel . |
| 4,594,283 | 6/1986 | Ohigashi . |
| 4,599,810 | 7/1986 | Sacre . |
| 4,660,228 | 4/1987 | Ogawa et al. . |
| 4,679,257 | 7/1987 | Town . |
| 4,725,481 | 2/1988 | Ostapchenko ............. 428/287 |

FOREIGN PATENT DOCUMENTS

| | | |
|---|---|---|
| 621569 | 6/1961 | Canada . |
| 0110627 | 6/1984 | European Pat. Off. . |
| 0111360 | 6/1984 | European Pat. Off. . |
| 206097 | 12/1986 | European Pat. Off. . |
| 238014 | 9/1987 | European Pat. Off. . |
| 2737756 | 3/1979 | Germany . |
| 3147202 | 6/1983 | Germany . |
| 3149878 | 6/1983 | Germany . |
| 3521479 | 1/1987 | Germany . |
| 3608758 | 10/1987 | Germany . |
| 3634294 | 12/1987 | Germany . |
| 2024100 | 1/1980 | United Kingdom . |
| 2114583 | 8/1983 | United Kingdom . |

OTHER PUBLICATIONS

*Encyclopedia of Chemical Technology*, Third Edition, vol. 10, Kirk–Othmer, John Wiley & Sons, pp. 156, 826, 944–946.

Kirk–Othmer, Encyclopedia of Chemical Technology, vol. 9, pp. 232–241.

*Primary Examiner*—James D. Withers
*Attorney, Agent, or Firm*—Oliff & Berridge

[57] ABSTRACT

In laminates composed of a woven or knitted fabric and a film impermeable to water and permeable to water vapor, the woven or knitted fabric is made of unstretched or partially stretched fibers. The laminates are highly extensible and retain the shape obtained by stretching. They are particularly useful as starting materials for intermediate layers in shoes and gloves and confer advantages over and above known laminates in respect to the manufacture and properties of the finished articles.

17 Claims, No Drawings

IRREVERSIBLY STRETCHABLE LAMINATE COMPRISING LAYERS OF WOVEN OR KNITTED FABRICS AND WATER-VAPOR PERMEABLE FILMS

This is a Continuation of application Ser. No. 07/713,020 filed Jun. 11, 1991, now abandoned, which is a Continuation of application Ser. No. 07/457,806, filed Jan. 5, 1990, now abandoned.

TECHNICAL FIELD

The invention relates to a laminate consisting of a woven or knitted fabric and a film which is impermeable to water and permeable to water vapor.

It also relates to the use of such laminates as starting material for the interlayer in shoes or gloves.

BACKGROUND

It is known to use breathing films for the manufacture of shoes or gloves. The purpose of these films is to impart a pleasant feeling to the wearer, because, on the one hand, they permit the transport of water vapor, so that body fluid such as sweat, after evaporation from the skin, can be dissipated to the environment through the film. On the other hand, these films are intended to be impermeable to liquid water, so that rain, for example, cannot pass to the skin through the shoe or glove. In other words, said breathing films must be impermeable to water and permeable to water vapor. They can then be utilized as interlayer for shoes or gloves, which also possess an outer layer and an inner layer, each of which may, for example, consist of leather or fabric. Films of this type and shoes or gloves that contain such films are described, for example, in West German Laid-open Applications 2,737,756, 3,147,202, U.S. Pat. Nos. 4,520,056, 4,545,841 and 4,679,257.

Among the disadvantages in employing such films is the fact that, for ease of handling and the necessary mechanical strength, they must have a certain minimum thickness. Very thin films cannot be used, since the stretching and shearing load in shoes or gloves requires a certain mechanical strength which is achieved only if the thickness reaches a certain minimum. The use of films with a particular minimum thickness, on the other hand, makes the article more expensive, since the breathing films constitute a cost factor that cannot be disregarded in the finished article.

Furthermore, the transport of water vapor to the environment is slowed down if the film thickness is relatively great.

Attempts have been made to overcome said disadvantages by employing laminates consisting of breathing film and unwoven fabrics, such as, for example, heat-bonded fleeces. This is, for example, described in U.S. Pat. Nos. 3,510,344, 3,713,938 and 4,594,283. The disadvantages in using such laminates for the manufacture of shoes or gloves lie in the fact that the unwoven fabrics such as, for example, fleeces, have only low stretchability so that the laminates cannot be bonded and formed in one piece with the outer layer of shoes. In this case, the problem is the same as with laminates containing fabrics consisting of fully stretched threads. This will now be described in detail hereinafter.

Laminates consisting of breathing films and woven and knitted fabrics have already been employed in the past. This is apparent, for example, from European Patent A 0,110,627, British Patent A 2,114,583, U.S. Pat. No. 4,599,810, West German Laid-open Application 2,737,756 and West German Laid-open Application 3,149,878. In all these cases, the woven or knitted fabrics consisted of fully stretched synthetic yarns or filament yarns. The disadvantage of these laminates is their relatively low stretchability. This has a disadvantageous effect on the manufacturing process during the fabrication of shoes or gloves. Since these laminates have only poor stretchability in the longitudinal and transverse directions, they must be cut to size in individual pieces and bonded with matching pieces of the inner layer. These pieces are then stitched together and the whole is bonded with the prefabricated, formed, one-piece outer layer, e.g., by adhesion. Thus, the manufacture of shoes or gloves not only becomes expensive, but the seams with which the individual parts consisting of laminate and inner layer are bonded together form, in the finished article, weak spots through which water can penetrate. Therefore, it is frequently necessary to waterproof these seams for example, by using sealant or seam-waterproofing tapes.

SUMMARY OF THE INVENTION

Therefore, the object of the present invention was to avoid said disadvantages of known laminates and to provide laminates which can be formed and bonded in one piece together with outer layers of shoes or gloves, i.e., without requiring individual prefabricated laminate parts to be stitched together at the edges.

This object is achieved by means of laminates which are characterized in that the woven or knitted fabric consists of unstretched or partly stretched filament yarns, that the laminate at room temperature has a stretchability of at least 150% in the longitudinal and transverse directions and that it essentially retains the acquired shape after being stretched in the longitudinal and/or transverse direction by a value between 150% and elongation at break, the stretchability or elongation for this purpose being defined according to DIN 53 857.

DETAILED DESCRIPTION OF PREFERRED EMBODIMENTS

Compared to known laminates, the laminates according to the invention have the advantage that they can be formed and bonded in one piece together with the outer layer of shoes or gloves, which can consist of leather or a fabric. To accomplish this, the outer layer can be laid on the laminate according to the invention and the resulting fabric can be formed, for example, over a last. The bonding of laminate and outer layer can be performed together with the shaping process or in a separate step, e.g., via full-surface adhesion by means of an intermediate film of adhesive. Preferably, however, the bonding is carried out only pointwise via individual activatable so-called adhesion spots, which will be explained in more detail hereinbelow. The bonding between outer layer and laminate can then be performed advantageously together with the shaping process by heating the fashioning last and thereby activating the adhesion spots. Once the formed structure consisting of outer layer and laminate according to the invention is in place, the inner layer, which in the shoe or glove faces the foot or the hand, as the case may be, is applied in the normal way in individual cut-to-size pieces and bonded with the one-piece structure consisting of outer layer and laminate, for example, by adhesion or stitching to the outer edges.

The possibility of forming and bonding the laminates according to the invention in one piece together with the outer layer results from the high stretchability, which is a prerequisite for the shaping process, for example, by means of lasts. This high stretchability is caused by the use of unstretched or partly stretched filament yarns in the component of the laminate made of woven or knitted fabric. The advantage of this shaping process by use of a one-piece laminate results from the fact that the breathing film is present in one piece in the shoe or glove, that is to say, no seams through which water could penetrate are present between individual prefabricated laminate parts so that the use of a sealant or waterproofing can be dispensed with.

For the laminates according to the invention, one must use, in addition to woven and knitted fabrics consisting of unstretched or partly stretched filament yarns, breathing films which themselves also have a stretchability of at least 150% in the longitudinal and transverse directions, and they must be impermeable to water but permeable to water vapor. Such films are known per se, for example, from patent specifications which have already been cited above, and from European Patent A 0,111,360. Films within the context of the laminates incorporating the invention mean flat, flexible structures with a thickness much smaller than their length and width. If they consist of polymers, such articles are also frequently known as films.

The woven and knitted fabrics of unstretched or partly stretched threads can be manufactured by known processes, and it must be ensured that the woven or knitted fabrics have a stretchability of at least 150% in the longitudinal and transverse directions. This means, on the one hand, that the fibers being used must have a longitudinal stretchability of at least 150% and that the production of the woven or knitted fabric must be carried out such that the stretchability will not decrease below 150 during the manufacture of the woven or knitted fabric. Thus, maximum further stretching as a result of high tensile forces must be avoided. The expression "partly stretched" threads in connection with the laminates according to the invention therefore means that a certain degree of stretching is permitted to occur during the thread manufacture and/or during the manufacture of the woven or knitted fabric, but only such that the stretchability of the fabric will not fall below 150%. The extent of stretching permissible depends in this case, among other things, on the thread material and can be deduced from the textile data of the filament yarns being provided, e.g., the stress-strain diagram.

One can also employ as unstretched or partly stretched threads within the framework of the invention so-called preoriented (FOY, POY) or partly preoriented (MOY) threads, which have been spun at high speed, e.g., at approximately 2000 m/min to 8000 m/min, provided they have the necessary stretching properties or permit the manufacture of laminates having the stretching properties of the invention.

The bonding between film and woven or knitted fabric in the laminates according to the invention can be effected by pointwise or surface adhesion. The adhesives selected for this purpose must be hydrophilic, especially in the case of surface adhesion, in order not to prevent the transport of water vapor, and they must not lower the stretchability of the laminates below a value of 150%. Hydrophilic foamed adhesives on a polyurethane or acrylate base are suitable.

The high stretchability of the laminates according to the invention alone is not sufficient to obtain the advantages of application. Rather, the shape acquired after stretching by 150% up to elongation at break, that is to say, the length and width of the laminate, must remain essentially the same, as soon as the force applied for stretching is no longer effective. Otherwise, restoring forces would occur in the structure consisting of outer layer and laminate. Therefore, no elastic ("stretch") threads can be used for the laminates according to the invention which, although they have a high stretchability, return to the original length as soon as the elongation force is no longer effective. The declaration that the acquired shape must be "essentially" retained means that there shall be no shortening of the length and width of more than about 10% as soon as the elongation force is no longer effective. It stands to reason that the laminates according to the invention essentially retain the shape acquired by stretching even if the stretching is less than 150%.

In a preferred embodiment, the laminates according to the invention have a stretchability of 250 to 400% in the longitudinal and transverse directions. Especially when making gloves, a higher stretchability than 150% is frequently necessary.

The film in the laminates according to the invention can be relatively thin, since the additional use of woven or knitted fabrics contributes to the mechanical strength. The use of thin films means that water vapor can be dissipated more rapidly from the skin of the wearer to the environment. Preferably, the film is between 5 and 50 μm, especially between 10 and 25 μm, thick.

In principle, arbitrarily chosen materials which lead to the required stretching properties can be used for the filament yarns making up the woven or knitted fabric of the laminates according to the invention. Preferably, synthetic organic polymers are used for this purpose, especially polyesters such as polyethylene terephthalate or polybutylene terephthalate, polyamide 6 or 66, copolyamides, or polyolefins such as polypropylene.

The material making up the breathing film can also be selected from a series of known materials as described in the references cited in the introduction. Again, a prerequisite here is that said stretching and restoring properties be achieved. Polyurethanes, polyolefins and copolyether esters are preferred for the film material. Especially favorable properties are achieved by use of a copolyester that consists of a plurality of repeating intralinear long-chain ester units and short-chain ester units, which are connected in random head-to-tail manner by ester bridges, the long-chain ester units corresponding to the formula

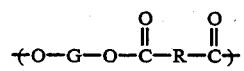

and the short-chain ester units corresponding to the formula

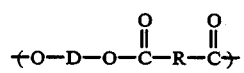

in which G is a divalent residue formed by removal of terminal hydroxyl groups of at least one long-chain glycol having a molecular weight in the range of 800 to 6000 and an atomic ratio of carbon to oxygen in the range of 2.0 to 4.3, at least 70 weight percent of the long-chain glycol having a carbon:oxygen ratio in the range of 2.0 to 2.4, R is a divalent residue formed by removal of carboxyl groups of at least one dicarboxylic acid with a molecular weight of less than 300, and D is a divalent residue formed by removal of hydroxyl groups of at least one diol having a molecular weight of less than 250, at least 80 mol % of the dicarboxylic acid being used consisting of terephthalic acid or an ester-forming equivalent thereof and at least 80 mol % of the low-molecular-weight diol consisting of 1,4-butane-diol or an ester-forming equivalent thereof, the sum of the mole percents of the dicarboxylic acid which is not terephthalic acid or its ester-forming equivalent and the low-molecular-weight diol which is not 1,4-butanediol or its ester-forming equivalent being not greater than 20, and the short-chain ester units forming 50 to 75 weight percent of the copolyether ester.

Such copolyether esters and the manufacture of films therefrom are described in European Patent A 0,111,360. The manufacture of the films can be performed, for example, according to the information in Kirk-Othmer, Encyclopedia of Chemical Technology, 9 (1966), pages 232–241. The special representatives of the copolyether esters named in European Patent A 0,111,360 are also usable for the laminates incorporating the invention.

To determine whether a breathing film is suitable for the laminates according to the invention, i.e., whether it is to a sufficient degree impermeable to water and permeable to water vapor, can be carried out as prescribed in DIN 53 495, ASTM E 96-66 (method B) and as taught by British Patent 2,024,100.

According to DIN 53 495, water adsorption is measured at 23° C., and according to ASTM E 96-66 (method B) water-vapor permeability is measured at 30° C. and 50% relative humidity. The water-repellent properties are measured according to the specification in British Patent 2,024,100 with a modified Sutter test apparatus and according to the "Mullin burst test". Films having a water-vapor permeability of at least 1000, preferably at least 2000 g/m².day and a water absorption of not more than 17 weight percent, preferably of not more than 11 weight percent, are very suitable for the laminates according to the invention.

In a preferred embodiment of the laminates according to the invention, they are provided on the surface of the film facing away from the woven or knitted fabric with heat-activatable adhesion spots consisting of an organic polymer. These adhesion spots serve the purpose of permitting a punctiform bond between the laminates and another layer, e.g., the outer layer of shoes or gloves. Point adhesion is to be preferred in this case to full-surface adhesion. The adhesion spots consisting of an organic polymer are heat-activatable, i.e., they can soften at high temperature, preferably in the range of 100° to 180° C. On recooling, the adhesion spots harden and thus create an adhesive bond between laminate and shoe or glove outer layer. If necessary, the adhesion at high temperature can be promoted by application of a light to medium contact pressure. Organic polymers with low softening point, e.g., in the range of 100° to 180° C., are suitable as material for the adhesion spots. Such thermoplastic polymers are known per se, typical representatives being copolyesters or copolyamides. The adhesion points can be applied by known techniques onto the film side of the laminates according to the invention, e.g., by screen printing.

Advantageously, the laminates according to the invention can be used as the starting material for an interlayer for shoes or gloves, which also have an outer layer and an inner layer. The above-described advantages in terms of fabrication and article properties result from the use of the laminates of the invention as the starting material for the interlayer. Here, the outer layer and inner layer of the shoe or glove frequently consist, independently of each other, of leather or a fabric, such as, for example, a woven fabric. Outer layers consisting of fabrics are suitable, for example, for gym shoes or sports shoes. Known lining materials can be inner plies or inner layers made up of fabrics. In many cases, the outer layer of shoes or gloves consists of leather because of its wearing and aesthetic qualities.

Preferably, the interlayer manufactured from the laminates according to the invention is introduced into the shoes or gloves in such a way that the film faces the outer layer and the woven or knitted fabric faces the inner layer. In this case, the inner layer in this case is the side of the shoe or glove turned toward the hand or foot. When the film is next to the outer layer, an effective barrier is created against the penetration of water, e.g., during rain, into the woven or knitted textile fabric of the laminate. In an advantageous embodiment, the laminate according to the invention is in this case bonded to the outer layer via the described adhesion spots and stitched at the outer edges.

In the interlayers of the finished shoe or glove, the laminates according to the invention are normally not present in their original form, since irreversible stretching occurs during the shoe or glove manufacture as a result of the shaping process, e.g., on lasts. Therefore, the interlayers of the finished article in normal cases have lower values of stretchability than do the laminates according to the invention, which are used as the starting material for the interlayer.

The invention will be illustrated hereinbelow with reference to a practical example. The (commercial) Sympatex ® film used here consists of a copolyether ester as set forth in and manufactured according to the process disclosed in European Patent A 0,111,360.

PRACTICAL EXAMPLE

1. Laminate

From polyester-filament yarn MOY 107 dtex f36 gl pr, spun at 2000 m/min take-off speed, a single-track tricot knitware was manufactured with 11×207 thread count and 23 stitch rows per cm. The weight per unit area of the knitware was 63 g/m². It was processed to a two-ply laminate with a SYMPATEX ® film (membrane) with a thickness of 25 μm, corresponding to 31 g/m², using about 10 g/m² of an adhesive. The adhesive (polyurethane) was dissolved in ethyl acetate and applied pointwise on the membrane, the solvent was evaporated at 40° C. and the membrane with adhesion spots was joined to the knitware by calendering at a roll temperature of about 80° C.

The following maximum degrees of stretching were measured on the laminate:
- longitudinal with respect to the direction of passage of the fabric: 255%,
- transverse with respect to the direction of passage of the fabric: 366%.

2. Processing

The laminate was formed by the vacuum deep-drawing process on a last in a deep-drawing machine (of the Illig company). The process was implemented with bottom heating of 120° C. for 10 sec. The cooling time before release of the vacuum was about 1 minute.

Formed parts corresponding to the shape of the last were obtained which, after removal of salient material and opening of the upper shaft region, are suitable for use as a watertight interlayer for shoes.

I claim:

1. A laminate consisting essentially of a substantially irreversibly stretchable woven or knitted fabric and a film which is impermeable to water and permeable to water vapor, wherein the woven or knitted substantially irreversibly stretchable fabric consists of at least partially irreversibly stretchable filament threads, wherein the film has a thickness ranging between about 5 and 50 μm, wherein the laminate at room temperature has a stretchability of at least 150% in the longitudinal and transverse directions and wherein the length and width of the laminate stretched in at least one of longitudinal and transverse directions by a value between 150% and elongation at break are not shortened by more than about 10% as soon as the elongation force to achieve the stretching is no longer effective.

2. The laminate as set forth in claim 1, wherein the laminate has a stretchability of 250 to 400%.

3. The laminate as set forth in claim 1, wherein the filament threads consist of a synthetic organic polymer material.

4. The laminate as set forth in claim 3, wherein the filament threads consist of a material selected from the group consisting of polyester, polyamide and polypropylene.

5. The laminate as set forth in claim 1, wherein the water-vapor-permeable, water-impermeable film consists of a material selected from the group consisting of polyurethane, polyolefin and a copolyether ester.

6. The laminate as set forth in claim 5, wherein the film material consists of a copolyester made up of a plurality of repeating intralinear long-chain ester units and short-chain ester units, which are connected in random head-to-tail manner by ester bridges, the long-chain ester units corresponding to the formula

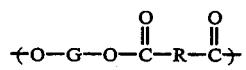

and the short-chain ester units corresponding to the formula

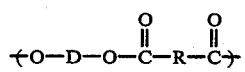

in which G is a divalent residue formed by removal of terminal hydroxyl groups of at least one long-chain glycol having a molecular weight in the range of 800 to 6000 and an atomic ratio of carbon to oxygen in the range of 2.0 to 4.3, at least 70 weight percent of the long-chain glycol having a carbon:oxygen ratio in the range of 2.0 to 2.4, R is a divalent residue formed by removal of carboxyl groups of at least one dicarboxylic acid with a molecular weight of less than 300, and D is a divalent residue formed by removal of hydroxyl groups of at least one diol having a molecular weight of less than 250, at least 80 mol % of said dicarboxylic acid consisting of terephthalic acid or an ester-forming equivalent thereof and at least 80 mol % of the low-molecular-weight diol consisting of 1,4-butane-diol or an ester-forming equivalent thereof, the sum of the mole percents of the dicarboxylic acid which is not terephthalic acid or its ester-forming equivalent and the low-molecular-weight diol which is not 1,4-butanediol or its ester-forming equivalent being not greater than 20, and the short-chain ester units forming 50 to 75 weight percent of the copolyether ester.

7. The laminate as set forth in claim 1, wherein the thickness of the film is between 10 and 25 μm.

8. The laminate as set forth in claim 1, wherein heat-activatable adhesion spots consisting of an organic polymer are disposed on the surface of the film facing away from the woven or knitted fabric.

9. The laminate according to claim 1, wherein the length and width of the laminate, irreversibly stretched in both the longitudinal and transverse directions by a value between 150% and elongation at break, is not shortened by more than about 10% as soon as the elongation force to achieve the stretching is no longer effective.

10. The laminate as set forth in claim 1, wherein the fabric has a stretchability of at least 150% in the longitudinal and transverse directions.

11. The laminate as set forth in claim 1, wherein the fabric is substantially free of elastic threads.

12. The laminate as set forth in claim 1, wherein the filament threads consist of a polyester material.

13. A laminate as set forth in claim 1, wherein said woven or knitted fabric is bonded to said film with a hydrophilic adhesive.

14. A laminate consisting essentially of a woven or knitted fabric and a film that is impermeable to water and permeable to water vapor, wherein the woven or knitted fabric consists of filament threads that are at least partially irreversibly stretchable by cold drawing and wherein (1) the film has a thickness ranging between about 5 and 50 μm, (2) the laminate at room temperature has a stretchability of at least 150% in the longitudinal and transverse directions, (3) the laminate, when stretched in a longitudinal or traverse direction by a value between 150% and elongation at break, loses less than 10% of its stretched length or width when a stretching force is no longer applied.

15. The laminate as set forth in claim 13, wherein the laminate, when stretched without further laminate treatment, losses less than 10% of its stretched length or width.

16. A laminate consisting essentially of a woven or knitted fabric and a film that is impermeable to water and permeable to water vapor, wherein the woven or knitted fabric consists of filament threads that are at least partially irreversibly stretchable by cold drawing and wherein (1) the film has a thickness ranging between about 5 and 50 μm, and (2) at room temperature, the laminate can be stretched in the longitudinal and transverse directions by a value between 150% and elongation at break without losing 10% or more of its stretched length or width when a stretching force is no longer applied.

17. A laminate consisting essentially of a substantially irreversibly stretchable woven or knitted fabric and a film which is impermeable to water and permeable to water vapor, wherein the woven or knitted substantially irreversibly stretchable fabric consists of at least partially irreversibly stretchable filament threads, wherein the woven or knitted fabric does not contain elastic threads, wherein the film has a thickness ranging between about 5 and 50 μm, wherein the laminate at room temperature has a stretchability of at least 150% in the longitudinal and transverse directions and wherein the length and width of the laminate stretched in at least one of longitudinal and transverse directions by a value between 150% and elongation at break are not shortened by more than about 10% as soon as the elongation force to achieve the stretching is no longer effective.

* * * * *